Aug. 27, 1946.　　　R. K. PRATT, SR　　　2,406,439
FLOWERPOT
Filed Jan. 26, 1944　　　2 Sheets-Sheet 1
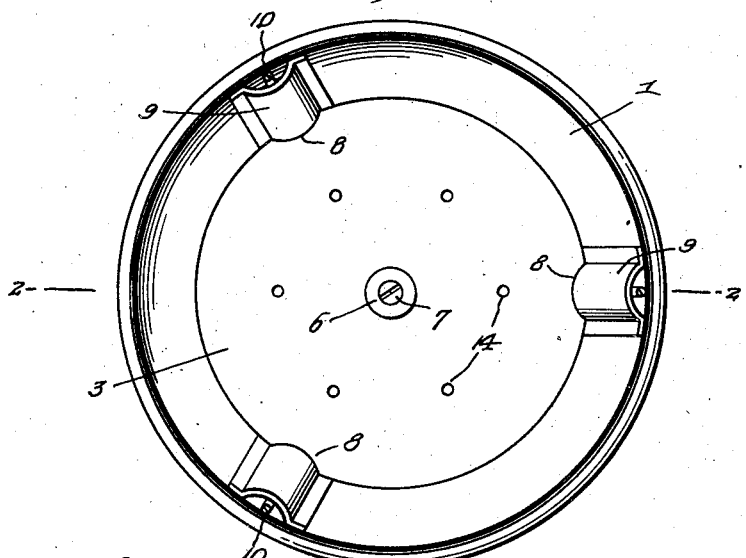
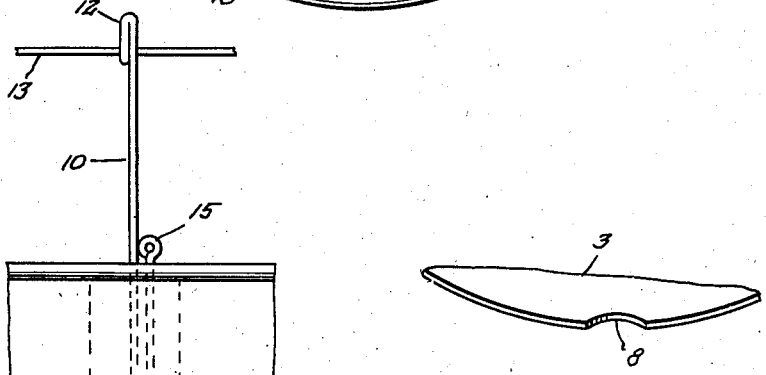
Inventor
Robert K. Pratt, Sr.
By Clarence A. O'Brien
and Harvey B. Jacobson
Attorneys Aug. 27, 1946.  R. K. PRATT, SR  2,406,439
FLOWERPOT
Filed Jan. 26, 1944  2 Sheets-Sheet 2

Inventor
Robert K. Pratt Sr.

By Clarence A. O'Brien
and Harvey B. Jacobson
Attorneys

Patented Aug. 27, 1946

2,406,439

UNITED STATES PATENT OFFICE 2,406,439

FLOWERPOT

Robert K. Pratt, Sr., Healys, Va.

Application January 26, 1944, Serial No. 519,786

1 Claim. (Cl. 47—38)

The present invention relates to new and useful improvements in flower pots, and has for its primary object to provide, in a manner as hereinafter set forth, a device of this character comprising novel means for watering and ventilating the roots of the plant while at the same time preventing rotting of said roots and souring of the soil in the lower portion of the pot.

Another very important object of the invention is to provide a flower pot of the character described which embodies plant-supporting means of a unique construction and arrangement.

Other objects of the invention are to provide a flower pot of the character described which will be comparatively simple in construction, strong, durable, attractive in appearance and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 1 is a top plan view of a flower pot constructed in accordance with the present invention, showing the plant-supporting rods in section.

Figure 3 is a fragmentary view in side elevation of the device.

Figure 4 is a perspective view of a portion of the false bottom.

Figure 2:
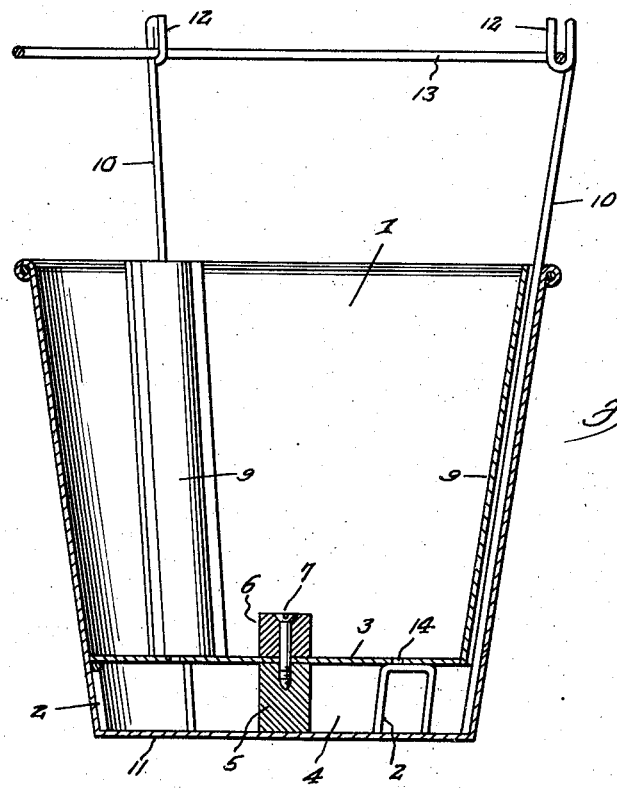
Figure 2 is a view in vertical section through the device, taken substantially on the line 2—2 of Figure 1.
Figures 5, 6:
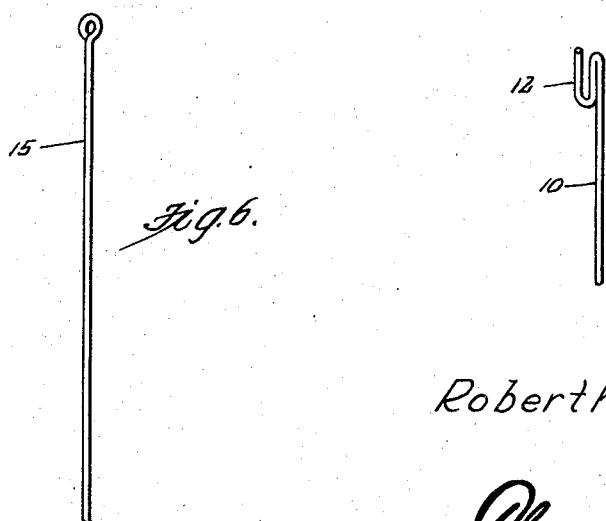
Figure 5 is a perspective view of the upper end portion of one of the plant-supporting rods.
Figure 6 is a detail view of the water gauge rod.

Referring now to the drawings in detail, it will be seen that the embodiment of the invention which has been illustrated comprises a tapered container 1 of suitable material and capacity. Fixed in the lower portion of the container 1 on the walls thereof are circumferentially spaced, substantially U-shaped ribs 2. The ribs 2 constitute supports which are engageable beneath the marginal portion of a removable, perforated false bottom 3 of metal or other suitable material. The perforated false bottom 3 provides a water chamber 4 in the lower portion of the container 1.

A depending centrally located support 5 is provided for the false bottom 3. The member 3 is further provided with an upstanding knob or handle 6. A screw 7 secures the elements 5 and 6 on the false bottom 3.

The false bottom 3 is further provided with spaced peripheral recesses or notches 8. The recesses or notches 8 accommodate the lower end portions of ventilating conduits 9 which are fixed on the walls of the container 1 and which extend to the top of said container. The ventilating conduits 9 communicate, at their lower ends, with the water chamber or compartment 4.

Mounted in the ventilating conduits 9 are rods 10 of wire or other suitable material which rest on the bottom 11 of the container 1. The rods 10 terminate, at their upper ends, in substantially U-shaped hooks 12. The hooks 12 are for the reception of a removable plant-supporting ring 13 of wire or other suitable material.

It is thought that the manner in which the device functions will be readily apparent from a consideration of the foregoing. Briefly, water placed in the container 1 seeps downwardly through the soil and moistens said soil with the roots of the plants therein. Any excess moisture drains by gravity through the perforations 14 in the false bottom 3 into the chamber or compartment 4. The excess water which would otherwise accumulate in the chamber 4 evaporates through the conduits 9. Adequate ventilation for the roots and soil in the lower portion of the container 1 is had through the conduits 9, the chamber 4 and the perforations 14. A predetermined quantity of water is preferably kept in the chamber 4. A gauge rod 15 is provided for ascertaining the depth of the water in the chamber 4, said gauge rod being insertible in any of the conduits 9. The rod 15 may remain in one of the conduits 9 when said rod is not in use. The construction and arrangement is such that the perforated false bottom 3 may be readily removed when it is desired to clean the device, renew the soil therein, et cetera. To support a plant in the container 1, the rods 10 are inserted in the conduits 9. The ring 13, in which the container 1 is first placed, is brought upwardly over said container and moved upwardly on the rods 10 beneath the foliage of the plant. This ring 13 is then engaged in the hooks 12 for firmly securing said ring in position on the rods 10. The ring 13 and the rods 10 may be adjusted vertically if desired. By elevating the rods 10 with the ring 13 engaged in the hooks 12, said rods 10 are bent and tensioned in the conduits 9 and in this manner frictionally secured in adjusted position.

It is believed that the many advantages of an improved flower pot constructed in accordance with the present invention will be readily understood, and although a preferred embodiment of the device is as illustrated and described, it is to be understood that changes in the details of construction may be resorted to which will fall within the scope of the invention as claimed.

What is claimed is:

A flower pot of the character described comprising a container, a formed bottom defining a chamber in its lower portion for the reception of water, said container being tapered from its top to its bottom, ventilating conduits in the container on the walls thereof communicating with the water chamber, upwardly diverging rods slidably mounted in the conduits, hooks on the upper ends of the rods, a plant-supporting ring mounted in said hooks, and a gauge rod adapted for insertion in a selected conduit while its associated rod is positioned therein, for indicating the depth of water in said chamber.

ROBERT K. PRATT, Sr.